(12) United States Patent
Sonoda

(10) Patent No.: US 9,884,424 B2
(45) Date of Patent: Feb. 6, 2018

(54) DISPLAY CONTROL APPARATUS AND METHOD FOR SAME

(71) Applicant: CANON KABUSHIKI KAISHA, Tokyo (JP)

(72) Inventor: Tetsuri Sonoda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 98 days.

(21) Appl. No.: 14/991,220

(22) Filed: Jan. 8, 2016

(65) Prior Publication Data
US 2016/0203799 A1 Jul. 14, 2016

(30) Foreign Application Priority Data
Jan. 14, 2015 (JP) ................................ 2015-005287

(51) Int. Cl.
*B25J 9/16* (2006.01)
*G09G 5/00* (2006.01)

(52) U.S. Cl.
CPC ... *B25J 9/1697* (2013.01); *G05B 2219/37092* (2013.01); *G05B 2219/39449* (2013.01); *G05B 2219/40169* (2013.01); *G09G 5/00* (2013.01); *G09G 2340/12* (2013.01); *G09G 2340/14* (2013.01); *Y10S 901/09* (2013.01); *Y10S 901/47* (2013.01)

(58) Field of Classification Search
CPC ......... B25J 9/1697; G05B 2219/40169; G05B 2219/37092; G05B 2219/39449; G09G 5/00; G09G 2340/12; G09G 2340/14; Y10S 901/47; Y10S 901/09

USPC ................................................... 700/245, 259
See application file for complete search history.

(56) References Cited

U.S. PATENT DOCUMENTS

| 5,855,553 A * | 1/1999 | Tajima | A61B 34/70 600/407 |
| 5,878,151 A * | 3/1999 | Tang | G06K 9/209 348/125 |
| 7,098,620 B2 * | 8/2006 | Hayashi | G02B 21/32 318/568.11 |

(Continued)

OTHER PUBLICATIONS

New Energy and Industrial Technology Development Organization, "Next-generation Robot Intelligence Technology Development Project", Development of Intelligent Module Group Pertaining to Online Teaching Support (post evaluation) subcommittee, document 5-1, Aug. 2012, pp. 1-107 (with partial translation of pp. iii-1-60,iii-1-61).

*Primary Examiner* — Jaime Figueroa
(74) *Attorney, Agent, or Firm* — Carter, Deluca, Farrell & Schmidt, LLP

(57) ABSTRACT

A display control apparatus operable to display an operation of a robot comprising: an obtaining unit configured to obtain measurement information of a processing target that includes at least one of the robot and a target that the robot operates; an emphasizing unit configured to generate emphasized display information that emphasizes a feature of a portion of the processing target, based on the measurement information; a composition unit configured to generate composite display information in which the emphasized display information and non-emphasized display information other than the emphasized display information are composed; and an output unit configured to output the composite display information to a display unit.

17 Claims, 15 Drawing Sheets

(56) References Cited

U.S. PATENT DOCUMENTS

| | | | | |
|---|---|---|---|---|
| 2003/0202092 | A1* | 10/2003 | Sadighi | B25J 9/1692 348/87 |
| 2004/0193305 | A1* | 9/2004 | Hayashi | G02B 21/32 700/160 |
| 2009/0248036 | A1* | 10/2009 | Hoffman | A61B 1/045 606/130 |
| 2011/0085074 | A1* | 4/2011 | Sonoda | G03B 7/095 348/363 |
| 2011/0106311 | A1* | 5/2011 | Nakajima | B25J 9/1697 700/253 |
| 2013/0325179 | A1* | 12/2013 | Liao | B25J 9/1692 700/254 |
| 2015/0073596 | A1* | 3/2015 | Fudaba | B25J 3/04 700/259 |
| 2017/0066131 | A1* | 3/2017 | Kamikawa | B25J 9/1692 |

\* cited by examiner

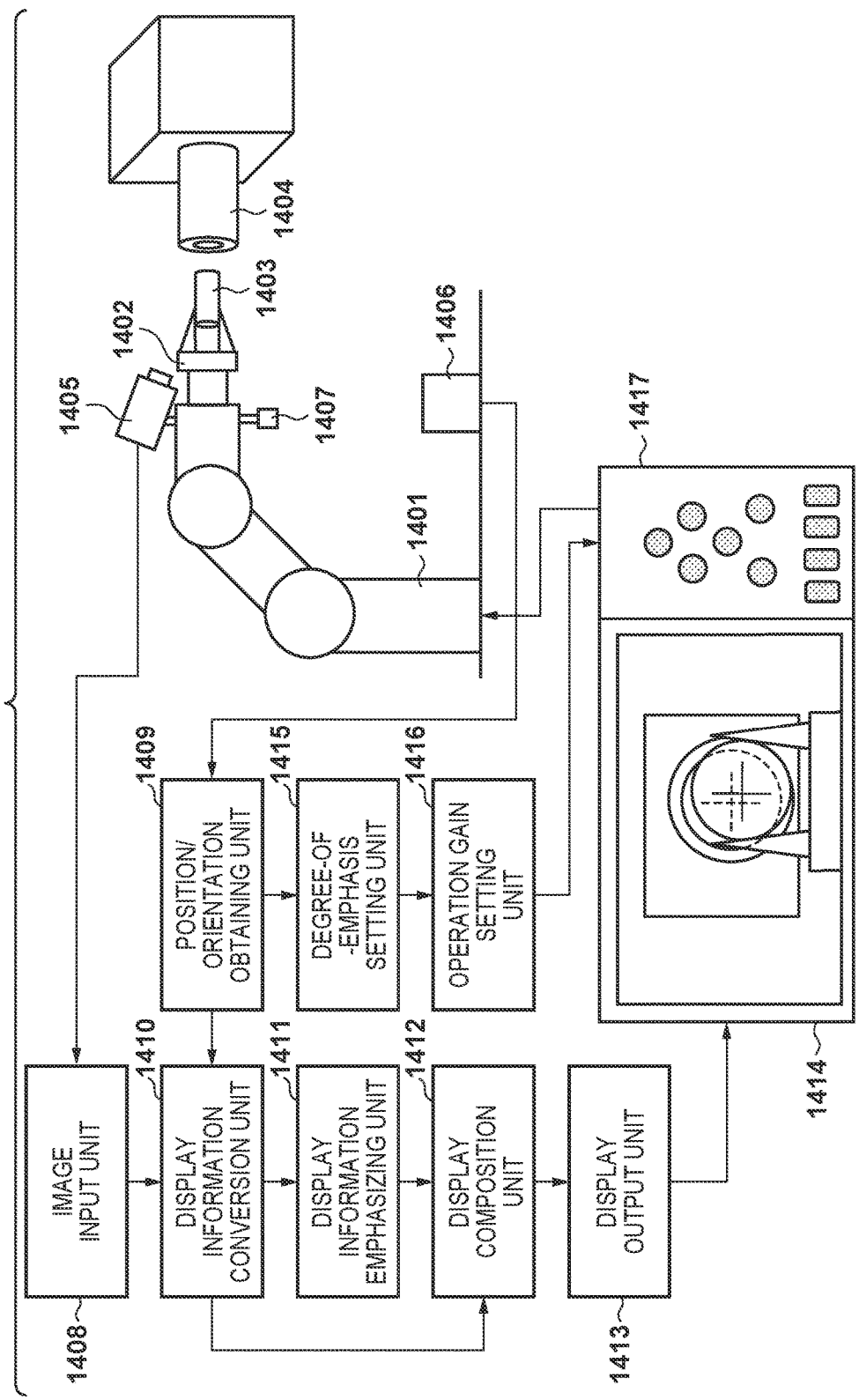

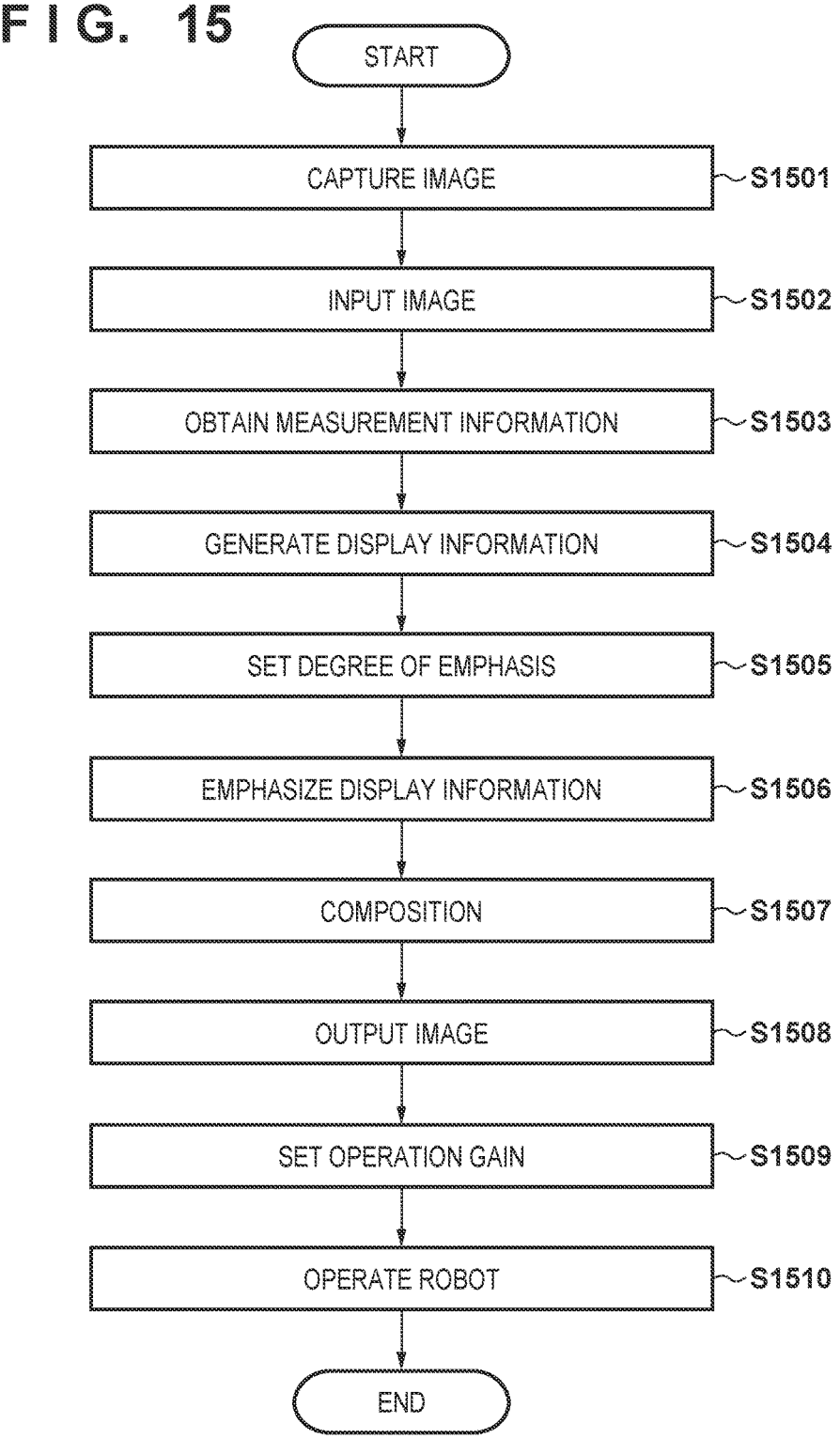

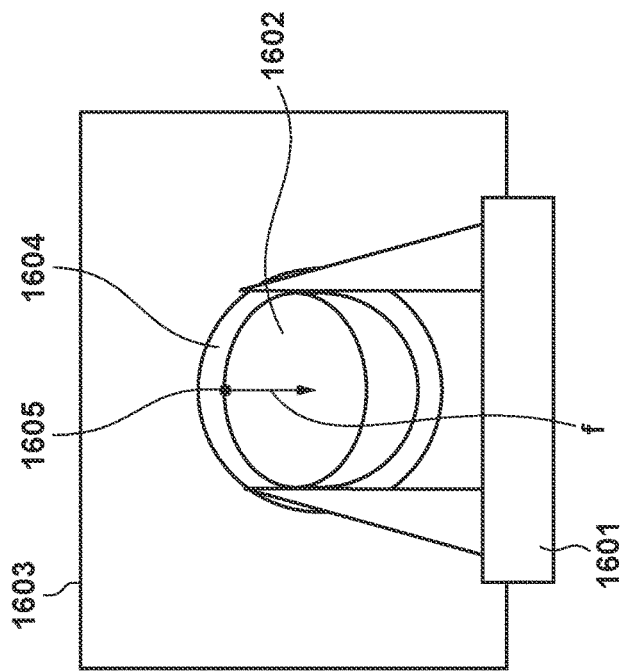
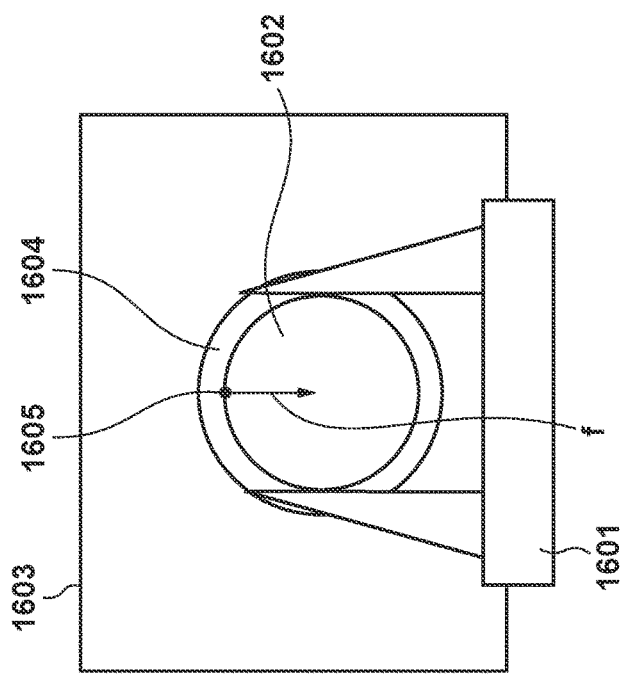

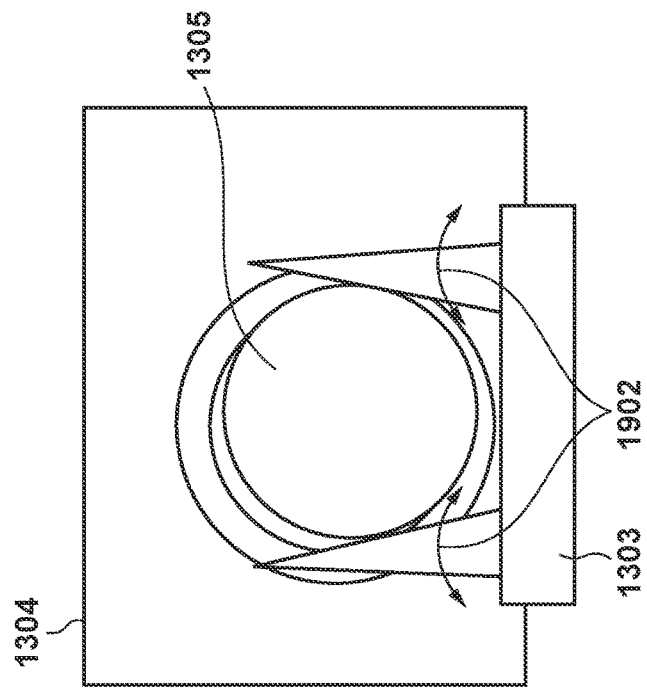
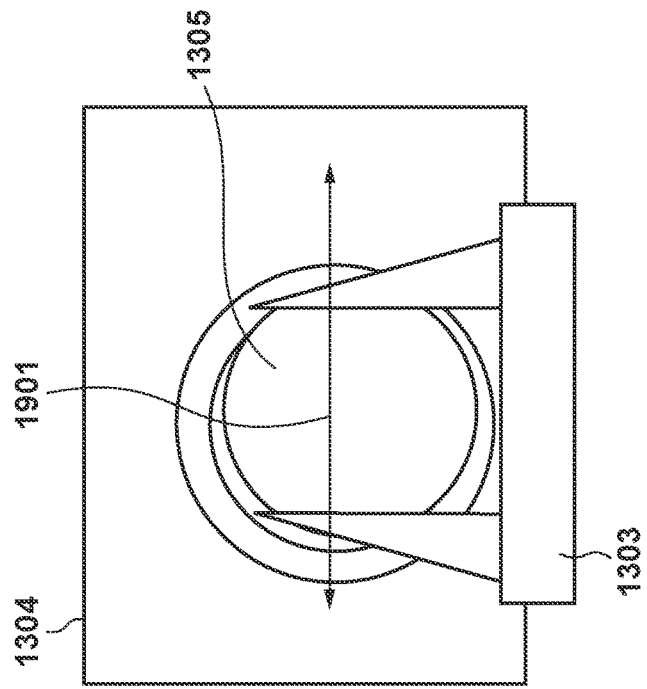

DISPLAY CONTROL APPARATUS AND METHOD FOR SAME

BACKGROUND OF THE INVENTION

1. Field of the Invention

The present invention relates to a display control technique that displays an operation of a robot.

2. Description of the Related Art

It is known that it is useful for understanding a situation when, in operation teaching of a robot, movement of a target object, such as a part, or an inserting operation, or the like, is taught, if a misalignment of its position or orientation or, and force generated at a time of insertion of a target is visualized for an teacher. In the first "Next-generation Robot Intelligence Technology Development Project" (post evaluation) subcommittee, document 5-1, a user interface that aids an teacher by superimposing, with a graph and a size of arrows for each XYZ axis of a three-dimensional space, information such as that of a position/orientation misalignment with the target or an acting force onto an image of a camera attached to an end effector of a robot is proposed.

However, for a method of visualizing information by arrows or a graph, for example, in a case in which all of position misalignment, orientation misalignment, and a force acted are visualized at once, displayed content of an image becomes very complicated due to many arrow or graphs, and may impede an teacher's intuitive understanding.

SUMMARY OF THE INVENTION

The present invention is conceived in view of the above-described problem, and provides a display technique capable of improving visibility of a state of a processing target.

A display control apparatus operable to display an operation of a robot, the apparatus comprising: an obtaining unit configured to obtain measurement information of a processing target that includes at least one of the robot and a target that the robot operates; an emphasizing unit configured to generate emphasized display information that emphasizes a feature of a portion of the processing target, based on the measurement information; a composition unit configured to generate composite display information in which the emphasized display information and non-emphasized display information other than the emphasized display information are composed; and an output unit configured to output the composite display information to a display unit.

By virtue of the present invention, it is possible to provide a display technique that can improve visibility of a state of a processing target.

Further features of the present invention will become apparent from the following description of exemplary embodiments (with reference to the attached drawings).

BRIEF DESCRIPTION OF THE DRAWINGS

FIG. 14 is a view for illustrating a system configuration a third embodiment.

FIG. 15 is a flowchart for describing an operation of the third embodiment.

FIGS. 16A and 16B are views of another embodiment for illustrating states before and after emphasizing by causing a target part in a captured image to be deformed by an action force generated by a contact.

FIGS. 19A and 19B are views, of another embodiment, for illustrating states before and after matching is achieved with an emphasized target part by translating and rotating the three-dimensional shape of the finger.

DESCRIPTION OF THE EMBODIMENTS

Embodiments of the present invention will now be described hereinafter in detail, using the drawings.

First Embodiment

Below, explanation will be given of a robot information display system (a display control apparatus) that uses a captured image from an imaging device (a camera) mounted on a leading end of the robot (for example, an arm-type robot) to visualize (display control) having emphasized position information necessary when teaching.

In a conventional system, information such as position misalignment or angle misalignment in each axial direction of an operation target is superimposed, with a size of an arrow or a graph, onto a captured image of a camera. However, if many pieces of information are superimposed, there is a problem in that screen content becomes complicated, and it is hard to see minute misalignments.

Accordingly, in the present embodiment, visualizing is performed after emphasizing a displacement and a size of a robot or a portion of a target that the robot operates in a captured image, and output to a viewer is performed. With this, when teaching the robot, the viewer, by observing a composite image that uses the image captured by the camera, can confirm position misalignment of a target object intuitively and easily.

Figure 1:
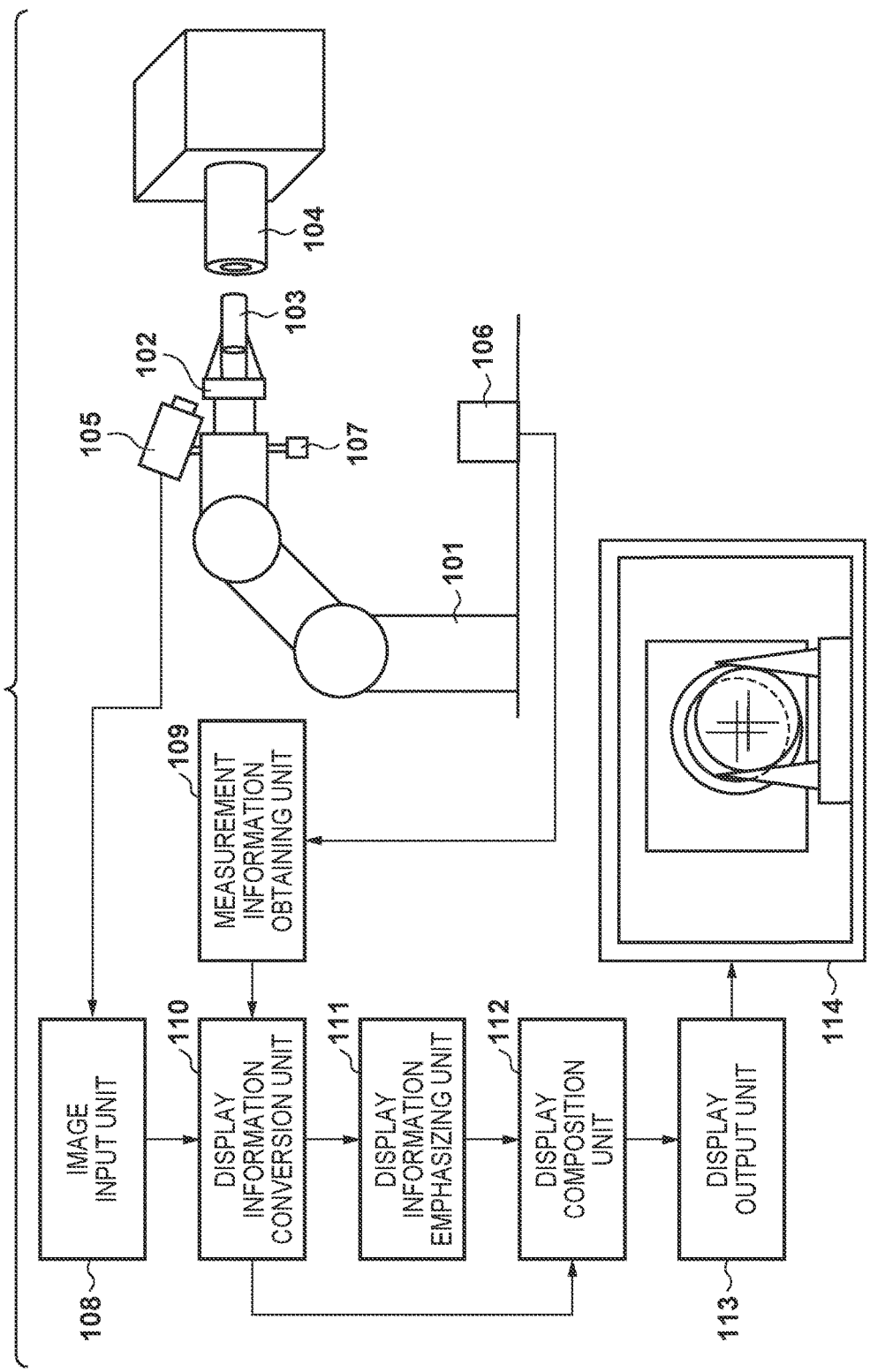
FIG. 1 is a view for illustrating a system configuration a first embodiment.

FIG. 1 illustrates an overall configuration of a robot information display system that emphasizes minute position misalignment in a captured image of a part that a robot grips and inserts; and that outputs to a viewer.

A robot 101 is arranged so as to use a finger 102 attached to a leading end to grip a target part 103, and perform an inserting operation towards a fixed part 104 that is fixed so as not to move. A camera 105 is arranged to the rear of the finger 102 on the robot 101, and functions as an imaging unit that captures a state of the finger 102, the target part 103 that the finger 102 grips, and the fixed part 104, and outputs a captured image. A tracker 106 measures, with the tracker 106 itself as a basis position, a position and orientation of a target coil 107 attached to a leading end of the robot 101.

An image input unit 108 is connected to the camera 105, obtains the captured image captured by the camera 105, and holds it as an input image. A measurement information obtaining unit 109 obtains and holds, as measurement information, position and orientation information that indicates a current position and orientation of the target coil 107 obtained by the tracker 106. In addition, the measurement information obtaining unit 109 holds environment information relating to the robot 101 and an environment surrounding it, such as a position of the fixed part 104 or a positional relationship, measured in advance, between the finger 102 and the target coil 107 of the robot 101.

From the captured image and the measurement information and the environment information that the measurement information obtaining unit 109 holds, a display information conversion unit 110 generates a position misalignment image as display information, by processing the captured image. The position misalignment image adds position information of the fixed part 104 and the target part 103 to a captured image which is described later, and visualizes mutual position misalignment.

From the position misalignment image, a display information emphasizing unit 111 extracts an image of only the fixed part 104 and the target part 103 that should be subject to emphasized display, magnifies, and generates an emphasized image that is emphasized display information. A display composition unit 112 generates a composite image (composite display information) by composing the emphasized image and, as non-emphasized display information, a region that excludes an image corresponding to the target part 103 and the fixed part 104 in the position misalignment image, achieving matching so that a sense of unnaturalness does not occur between the two. A display output unit 113 is connected to a display unit 114 such as a liquid crystal monitor, and outputs the generated composite image to a viewer so that it can be seen.

Note that, other than components shown in the figure, the system illustrated in FIG. 1 is provided with components installed in a computer, such as a CPU, a ROM, and a RAM. By the CPU reading a program stored in the ROM and executing it on the RAM, operations of various components illustrated in FIG. 1 are controlled. In addition, various components of the image input unit 108 to the display output unit 113 may be realized by dedicated hardware, or may be realized by a program (software) executed by the CPU.

Figure 2:
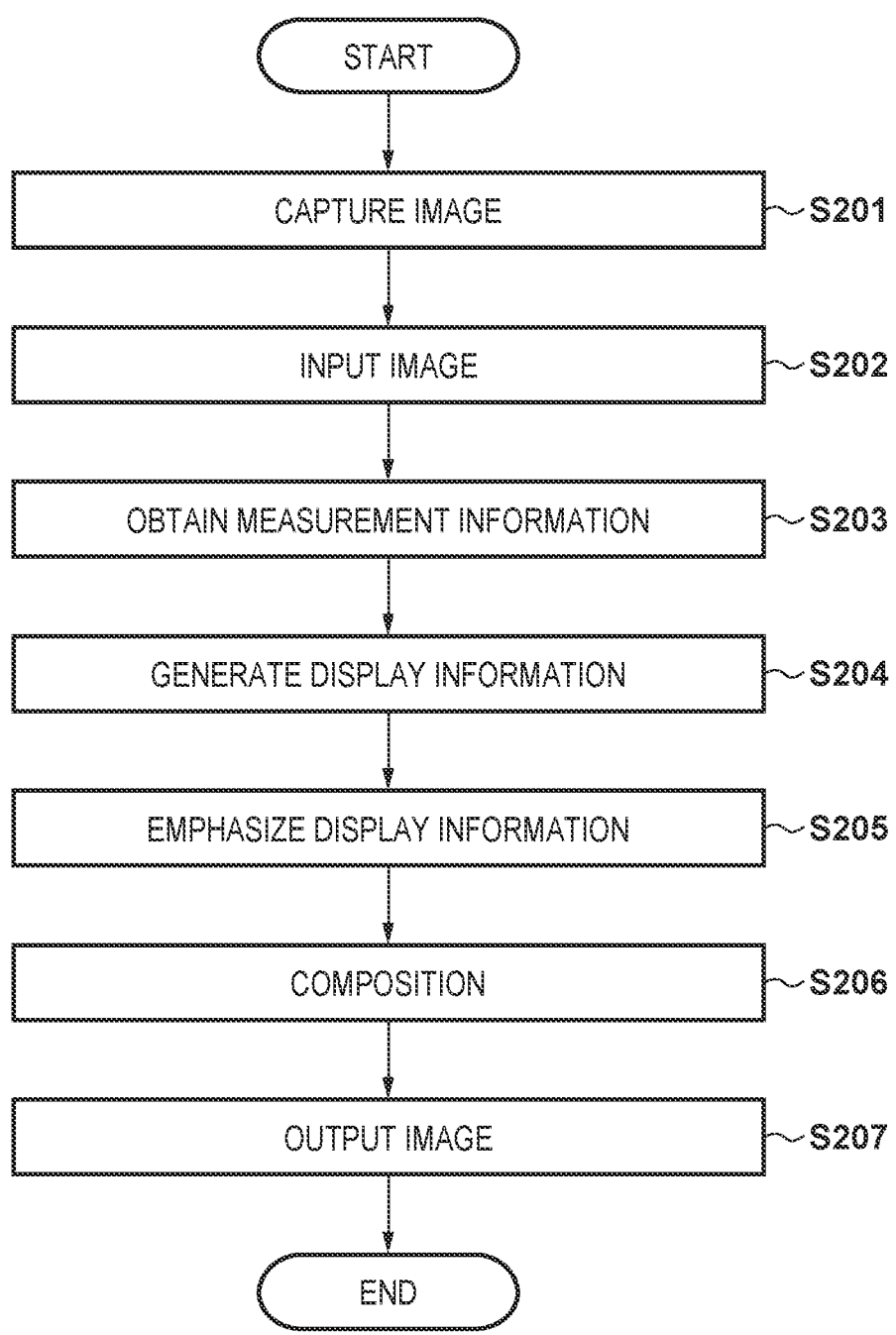
FIG. 2 is a flowchart for describing an operation of a first embodiment.

FIG. 2 illustrates a flowchart for describing an operation by which a captured image from the camera 105 mounted on the leading end of the robot 101 is used for visualization, after emphasizing position information necessary for teaching. Note that processing that this flowchart illustrates is realized by the CPU reading and executing a program stored in the ROM.

Figure 3:
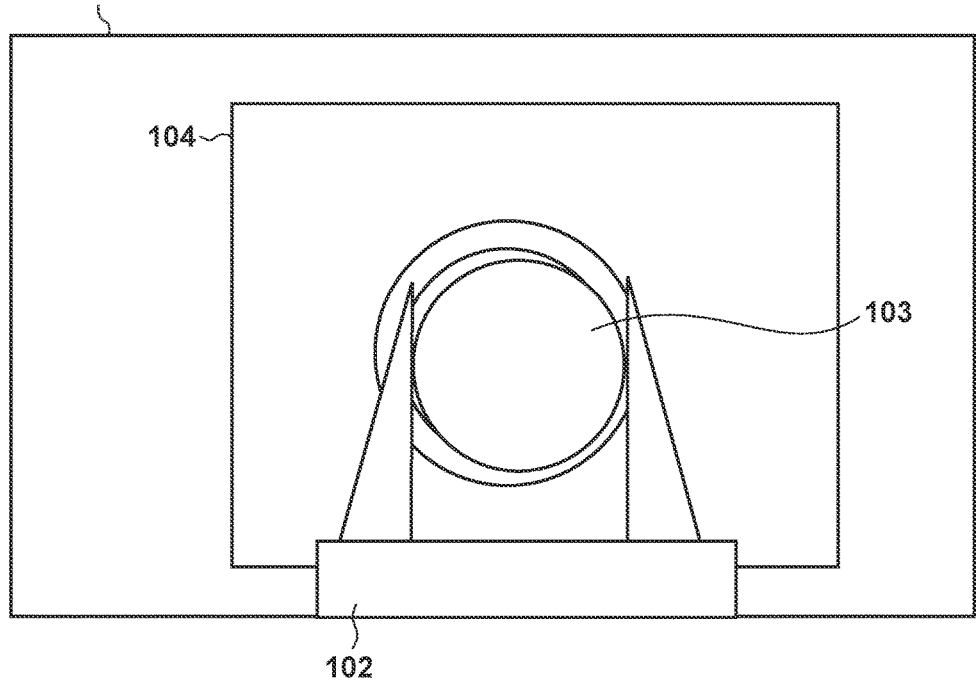
FIG. 3 is a view for illustrating a captured image of the first embodiment.

In step S201, the camera 105 captures a state/condition of the finger 102 positioned in front of the camera 105, the target part 103 that the finger 102 grips, and the fixed part 104. An example of a captured image thereby obtained is a captured image 301 illustrated in FIG. 3. As illustrated in FIG. 3, a state in which images of each of the finger 102, the target part 103, and the fixed part 104 are included in the captured image 301 is illustrated.

Figure 4:
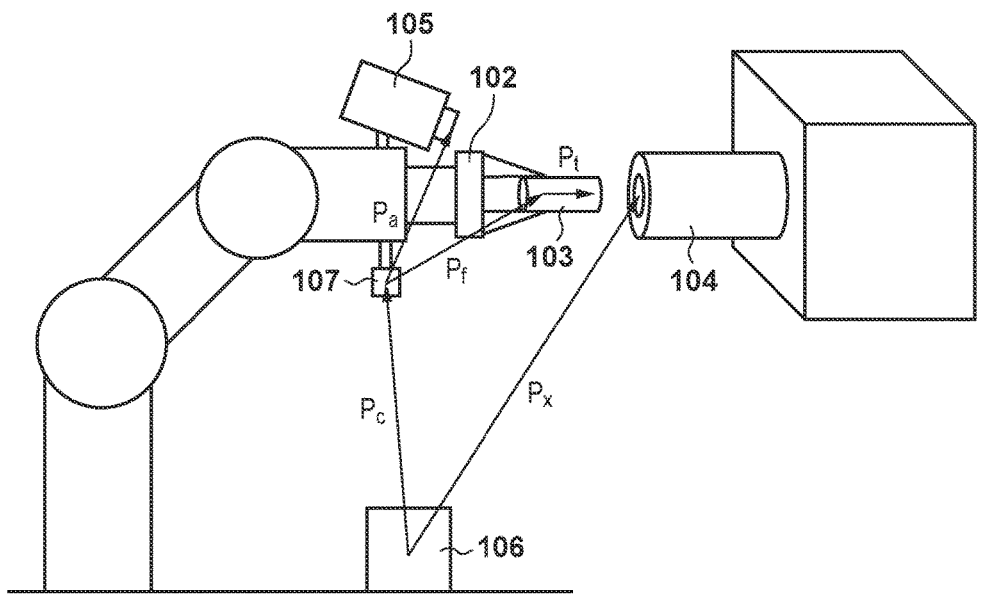
FIG. 4 is a view for illustrating positions and orientations of each unit of the first embodiment.

In step S202 the image input unit 108 obtains the captured image as an input image, and holds it. In step S203 the measurement information obtaining unit 109 obtains measurement information. Specifically, as illustrated in FIG. 4, the measurement information obtaining unit 109, with the tracker 106 as a basis position, obtains as measurement information a position/orientation Pc of the target coil 107 that is attached to a leading end of the robot 101. As described below, the position/orientation Pc is measured by using the tracker 106.

The tracker 106 is provided internally with transmission coils in each of three orthogonal axis directions, and causes an alternating current magnetic field of a predetermined frequency to be generated in a space thereof. The target coil 107 is also provided internally with reception coils in each of three orthogonal axis directions, and generates electromotive force due to an electromagnetic induction in the alternating current magnetic field. By comparing a magnitude of the electromotive force of the reception coils overall with values at each position that are measured in advance, it is possible to measure a distance between the tracker 106 and the target coil 107. In addition, by comparing a magnitude of the electromotive force of each axis of the reception coils when the magnetic field is generated at each axis of the transmission coils, it is possible to measure an orientation at the three axes of the reception coils, in other words, the target coil 107.

The tracker 106 uses these measurement values to measure a position/orientation Pc of the target coil 107. As in Equation (1) below, Pc is represented by a 4×4 (four-by-four) affine matrix that respectively combines a rotation matrix Rc and a translation vector Tc. Below, positions and orientations described similarly are represented by similar affine matrices. After measurement by the tracker 106, the position/orientation Pc is transferred to the measurement information obtaining unit 109 as measurement information, and held.

[EQUATION 1]

$$P_c = (R_c T_c) = \begin{pmatrix} R_{cxx} & R_{cyx} & R_{czx} & T_{cx} \\ R_{cxy} & R_{cyy} & R_{czy} & T_{cy} \\ R_{cxz} & R_{cyz} & R_{czz} & T_{cz} \\ 1 & 1 & 1 & 1 \end{pmatrix} \quad (1)$$

The measurement information obtaining unit 109 holds, as environment information, the position/orientation Pa of the camera 105 and the position/orientation Pf of the leading end of the finger 102, which have the target coil 107, measured in advance, as the basis position. Furthermore, the measurement information obtaining unit 109 holds, as environment information, an insert position/orientation Pt of the target part 103 with the position/orientation Pf as a basis, and an insert position/orientation Px of the fixed part 104 with the tracker 106 as a basis position. In addition, the measurement information obtaining unit 109 holds a focal distance f, which is a camera intrinsic parameter of the camera 105 and is measured in advance, and CAD data, which is three-dimensional shape information of the target part 103 and the fixed part 104. Note that an origin position of the camera 105 used in the present embodiment and a center of an image are assumed to match.

Figure 5:
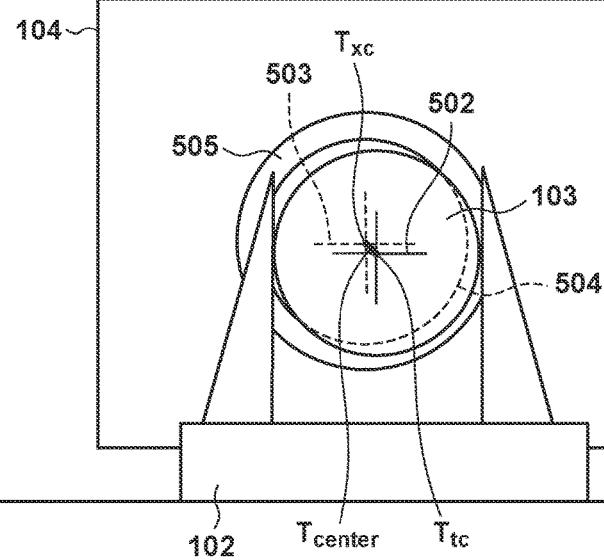
FIG. 5 is a view for illustrating a position misalignment image of the first embodiment.

In step S204 the display information conversion unit 110 uses the captured image 301 as well as the environment information and the measurement information that the measurement information obtaining unit 109 holds to generate the display information. FIG. 5 illustrates a position misalignment image 501, which is an example of the display information.

Initially, the display information conversion unit 110 obtains the position/orientation Pc, which is measurement information, from the measurement information obtaining unit 109. Similarly, the display information conversion unit 110 obtains each kind of the positions/orientations Pa, Pf, Pt, and Px, which are environment information, from the measurement information obtaining unit 109. In addition, the display information conversion unit 110 also obtains, from the measurement information obtaining unit 109, the focal distance f of the camera 105, which is measured in advance, as well as the CAD data of the target part 103 and the fixed part 104.

Next, the display information conversion unit 110 calculates an insert position Ttc of the target part 103 and an insert position Txc of the fixed part 104, on the captured image viewed from the camera 105. Ttc and Txc can be calculated by using the position and orientation of each component in the following Equation (2).

[EQUATION 2]

$$\begin{cases} T_{tc} = Proj \cdot P_a^{-1} \cdot P_f \cdot P_t \cdot \begin{pmatrix} 0 \\ 0 \\ 0 \end{pmatrix} \\ T_{xc} = Proj \cdot P_a^{-1} \cdot P_c \cdot P_x \cdot \begin{pmatrix} 0 \\ 0 \\ 0 \end{pmatrix} \end{cases} \quad (2)$$

Here, Proj in Equation (2) is a projection matrix of the camera 105, and is represented in the following Equation (3) by using the focal distance f.

[EQUATION 3]

$$Proj = \begin{pmatrix} f & 0 & 0 & 0 \\ 0 & f & 0 & 0 \\ 0 & 0 & 1 & 0 \end{pmatrix} \quad (3)$$

The display information conversion unit 110 renders, on the captured image 301, crosshair cursors 502 and 503 on positions of the calculated insert positions Ttc and Txc, as illustrated in FIG. 5. These function as display information that visualize misalignment of the insert positions of the target part 103 and the fixed part 104. Furthermore, the display information conversion unit 110 renders an edge portion 504 of a three-dimensional shape of each of the target part 103 and the fixed part 104, as display information, on top of the insert positions Ttc and Txc. At this point, a hidden edge portion that is hidden from the viewpoint of the camera 105 and cannot be observed directly is rendered with a dotted line. With this, even if an appearance of the fixed part 104 is largely obstructed due to the target part 103, it is possible to visually recognize the position of the fixed part 104.

Figure 6:
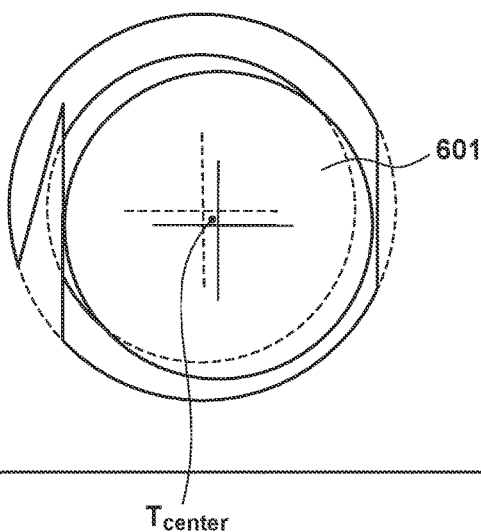
FIG. 6 is a view for illustrating an emphasized image of the first embodiment.

In step S205, the display information emphasizing unit 111 generates an emphasized image for emphasizing display information. Specifically, the display information emphasizing unit 111 extracts from the position misalignment image 501 and magnifies only an inserting unit 505 of the fixed part 104 and the target part 103 that should be subject to emphasized display, and generates, as emphasized display information, an emphasized image 601 as illustrated in FIG. 6.

Figure 7:
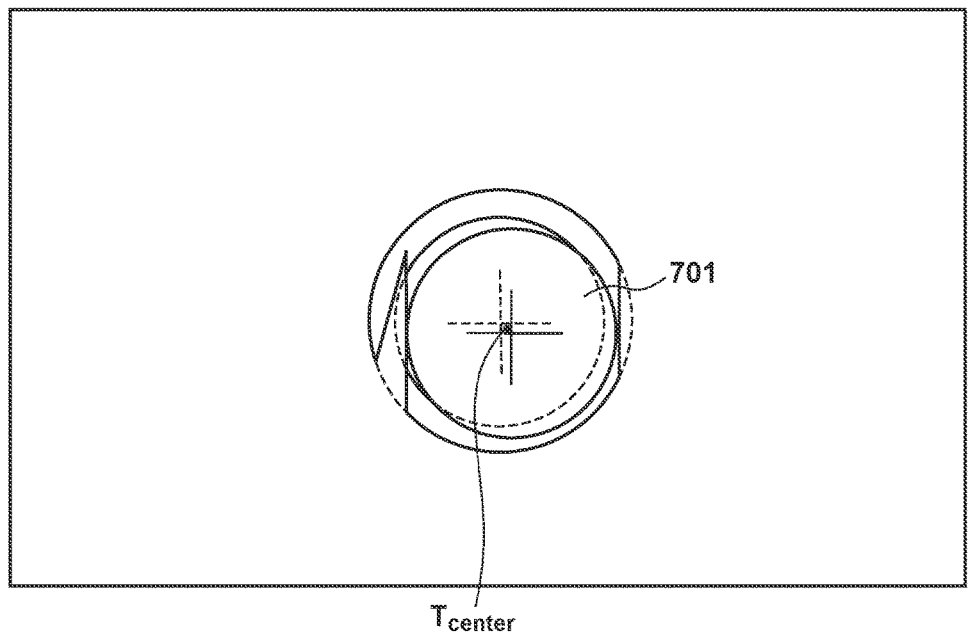
FIG. 7 is a view for illustrating an emphasized region of the first embodiment.

Firstly, from a region for which a three-dimensional shape of the target part 103 and the fixed part 104 was rendered on the insert positions Ttc and Txc calculated in step S203, an emphasized target region 701 (FIG. 7) corresponding to the target part 103 and the inserting unit 505 of the fixed part 104 in the position misalignment image 501 of FIG. 5 is extracted. Next, centering the extracted emphasized target region 701 on a center-point position Tcenter of the insert positions Ttc and Txc, for example, expansion with a magnification factor M=1.5 times is performed, and the emphasized image 601 illustrated in FIG. 6 is generated.

With this, by magnifying and emphasizing minute position misalignment between the target part 103 and the fixed part 104 for which confirmation was difficult on the position misalignment image 501, it is possible to easily confirm understanding of the position misalignment.

Figure 8:
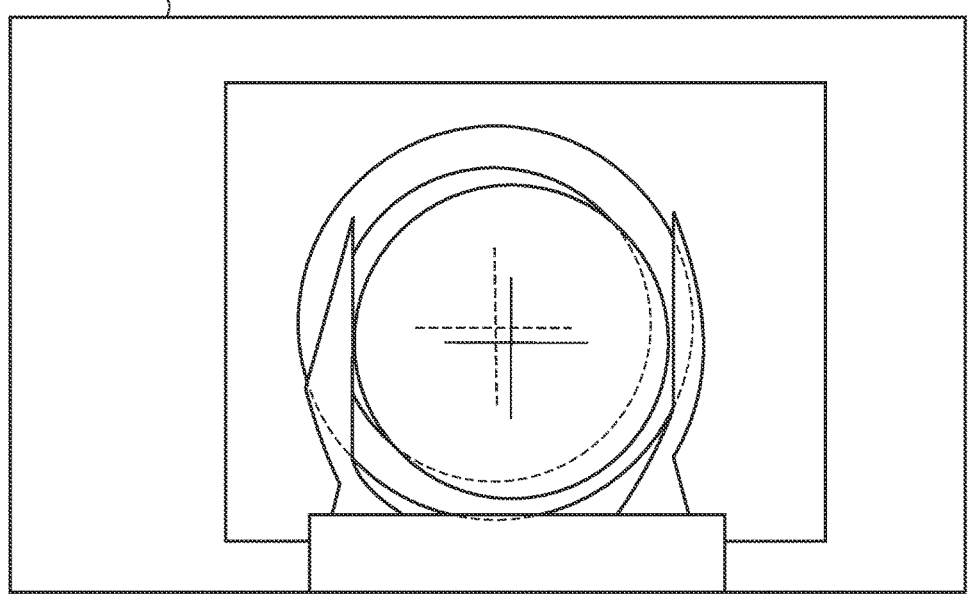
FIG. 8 is a view for illustrating a composite image of the first embodiment.

In step S206, the display composition unit 112 performs display composition of the position misalignment image 501 and the emphasized image 601. Specifically, the display composition unit 112 composes the position misalignment image 501, which is non-emphasized display information, and the emphasized image 601, which is emphasized display information, by causing them to be matching such that a sense of unnaturalness does not arise. FIG. 8 illustrates an example of a composite image 801.

Figure 9:
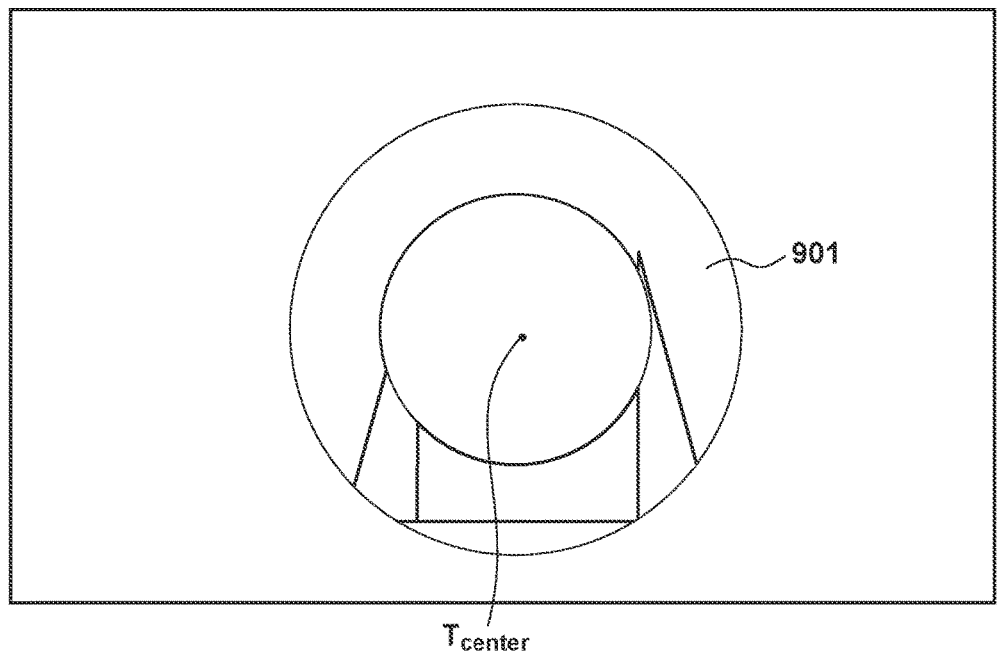
FIG. 9 is a view for illustrating a matching region of the first embodiment.
Figure 10:
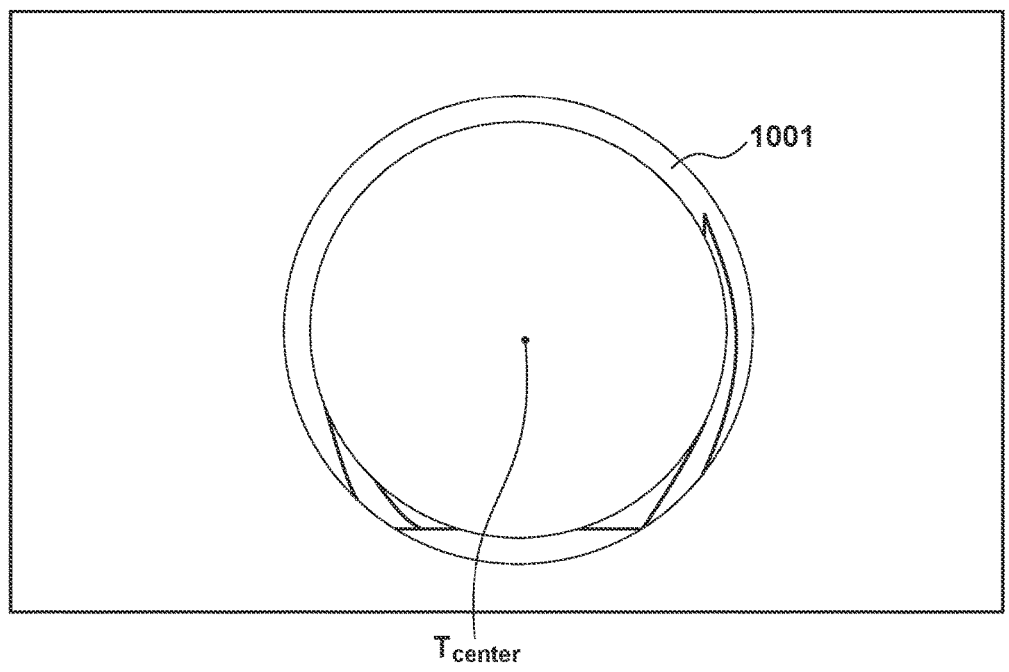
FIG. 10 is a view for illustrating a matching image of the first embodiment.

Here, firstly the display composition unit 112 extracts a matching region 901, illustrated in FIG. 9, as a difference between a region that magnifies by 1.7 times the emphasized target region 701 in the position misalignment image 501 converted in step S204, and a region of the emphasized target region 701. Next, the display composition unit 112 generates a matching image 1001 that is illustrated in FIG. 10 by performing deformation of the image in the matching region 901, wherein the magnification factor M of a region closest to the center Tcenter is equally set as 1.5 times, a farthest region is set to no magnification, and the magnification factor therebetween is changed in a gradation. Furthermore, the display composition unit 112 generates the composite image 801 by superimposing the matching image 1001 and the emphasized image 601 in that order on the position misalignment image 501. With this, it is possible to perform unification with no sense of unnaturalness and without a discontinuous portion occurring between the position misalignment image 501 and the emphasized image 601.

While having a field of view that does not change from the original captured image, the composite image 801 enables a minute position misalignment between the target part 103 and the fixed part 104, to which attention should be paid, to be easily understood. As a result, a viewer intuitively can understand information of position misalignment from the composite image, without the screen content being complicated. In other words, in the present embodiment, by generating the emphasized image 601, it is possible to make a predetermined region of interest (the emphasized image 601) in the image easily distinguishable from another region. Note, in this embodiment, by magnifying a region of interest image in a display image or making a density value (a luminance value/a pixel value) thereof higher than another region image, an emphasized image that emphasizes a characteristic of an image is generated, but limitation is not made to this. For example, instead of a density value, configuration may be taken to apply a predetermined pattern or to apply sharpening to a target region of interest image.

In step S207 the display output unit 113 outputs the image. Specifically, the composite image 801 illustrated in FIG. 8 is output on the display unit 114, and is presented to a viewer. Through the output of the display unit 114, the viewer can confirm position misalignment of the robot at a time of teaching.

As explained above, by virtue of the present embodiment, a viewer can confirm intuitively and easily position misalignment by observing a composite image that emphasizes a displacement and a size of a robot or a portion of a target that the robot operates, in an image captured by a camera.

Second Embodiment

In the second embodiment, instead of obtaining information regarding an actual robot according to the first embodiment, explanation is given for a robot information display system, in an offline teaching environment reproduced by a computer, that emphasizes and then visualizes position information necessary at a time of teaching by using CG (Computer Graphics) images.

In a conventional offline teaching environment, information such as angle misalignment or position misalignment in each axial direction is also superimposed, with a graph or a size of an arrow or a numerical value, onto a CG image that represents a robot environment. However, if many pieces of information are superimposed, there is a problem in that screen content becomes complicated, and it is hard to see minute misalignments.

Accordingly, in the present embodiment, visualizing is performed after emphasizing a displacement and a size of a robot or a portion of a target that the robot operates in a CG image, and output to a viewer is performed. With this, by observing a composite image that uses the CG image, the viewer can confirm intuitively and easily position misalignment at a time of an offline teaching for a robot.

Figure 11:
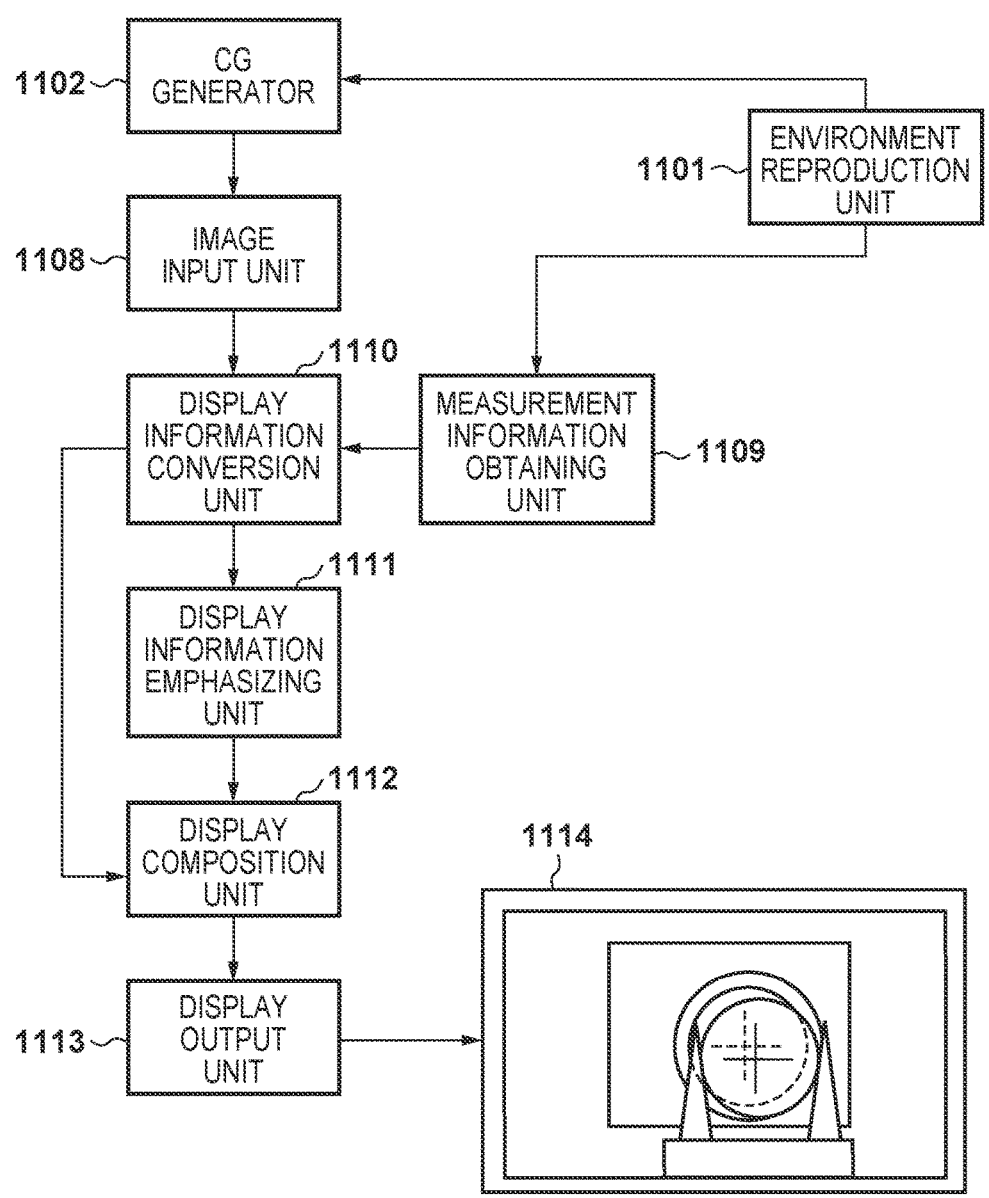
FIG. 11 is a view for illustrating a system configuration a second embodiment.

FIG. 11 illustrates an overall configuration of a robot information display system that emphasizes minute position misalignment in a CG image of a part that a robot grips and inserts; and that outputs to a viewer.

Figure 13:
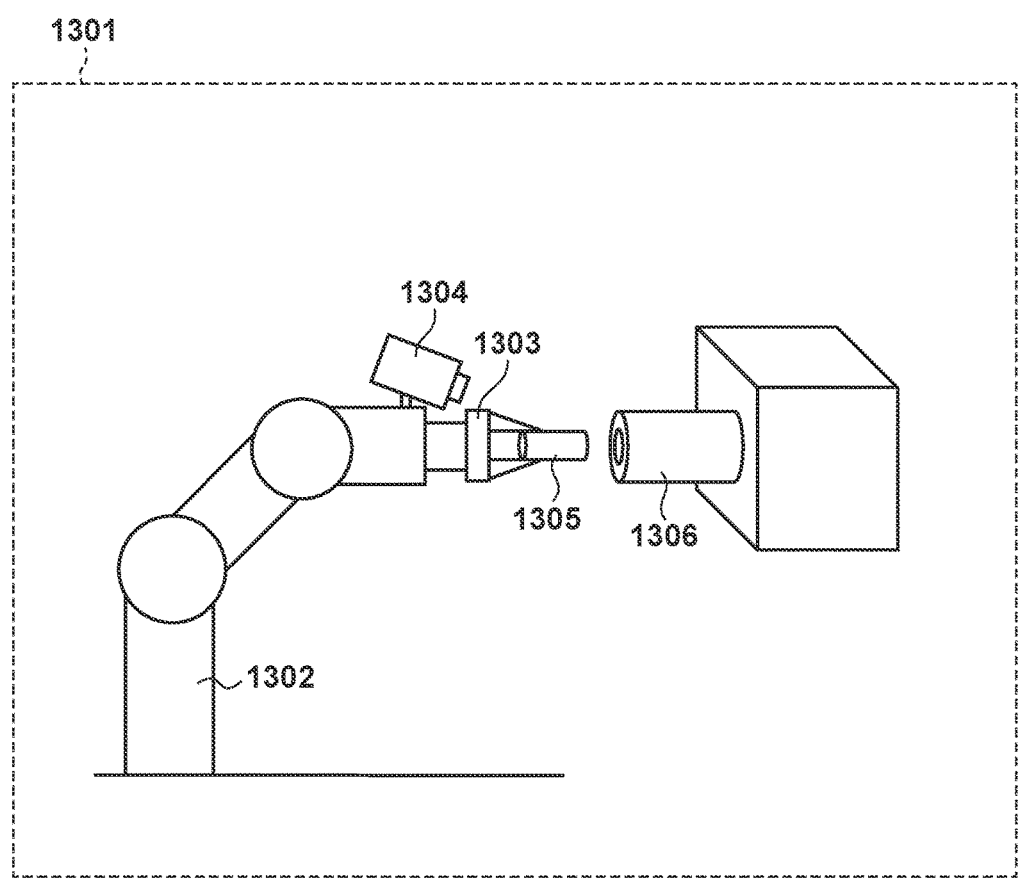
FIG. 13 is a view for illustrating a virtually constructed robot environment of a second embodiment.

An environment reproduction unit 1101 reproduces by simulation a three-dimensional shape and mechanical behavior of the robot 101 according to the first embodiment and a surrounding environment, and virtually establishes a reproduction environment 1301 illustrated in FIG. 13. A CG generator 1102 generates, based on the virtually established reproduction environment 1301, a CG image of a viewpoint viewed from a virtual camera 1304 illustrated in FIG. 13.

An image input unit 1108 through to a display unit 1114 in FIG. 11 respectively correspond to the image input unit 108 to the display unit 114 in FIG. 1 of the first embodiment, and have the same functions. However, the image input unit 1108 obtains a CG image as the input image. In addition, in place of obtaining the measurement information from the tracker 106 in the first embodiment, a measurement information obtaining unit 1109 obtains the measurement information from the environment reproduction unit 1101.

Note that, other than components shown in the figure, the system illustrated in FIG. 11 is provided with components installed in a computer, such as a CPU, a ROM, and a RAM. By the CPU reading a program stored in the ROM and executing it on the RAM, operations of various components illustrated in FIG. 11 are controlled. In addition, various components of the environment reproduction unit 1101 to a display output unit 1113 may be realized by dedicated hardware, or may be realized by a program (software) executed by the CPU.

Figure 12:
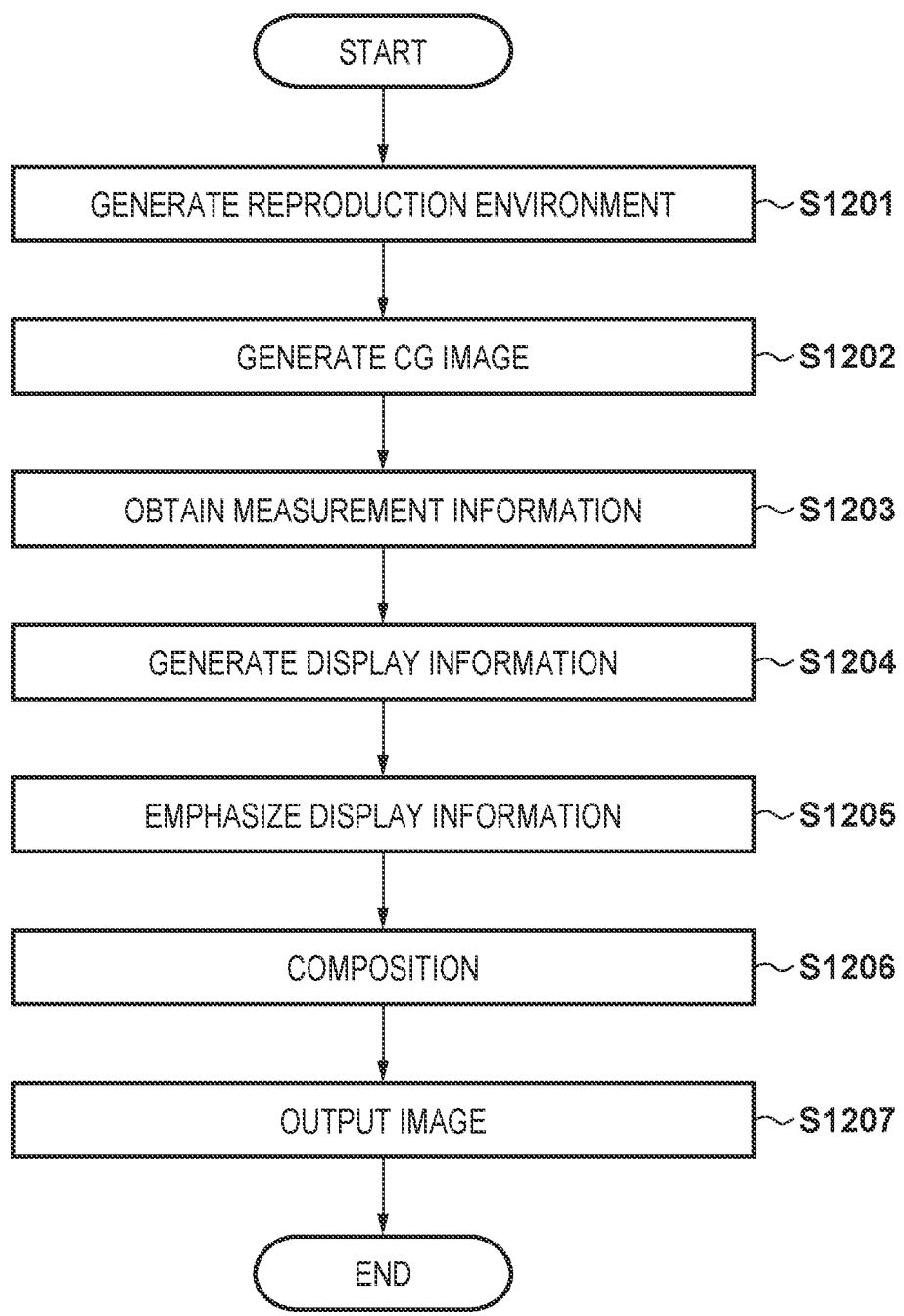
FIG. 12 is a flowchart for describing an operation of a second embodiment.

FIG. 12 illustrates a flowchart for describing operations that output having emphasized the position information necessary for teaching with respect to a CG image displayed at a time of offline teaching. Note that processing that this flowchart illustrates is realized by the CPU reading and executing a program stored in the ROM.

In step S1201 the environment reproduction unit 1101 generates a reproduction environment. Specifically, the environment reproduction unit 1101 reproduces by simulation a three-dimensional shape and mechanical behavior of the robot 101 according to the first embodiment and a surrounding environment, and virtually establishes the reproduction environment 1301 illustrated in FIG. 13. The reproduction environment 1301 is comprised from CAD data that represents shapes of a virtual robot 1302, a virtual finger 1303, the virtual camera 1304, a virtual target part 1305, and a virtual fixed part 1306 which are illustrated in FIG. 13; positions and orientations respectively corresponding to Pa, Pf, Pt and Px in FIG. 4 of the first embodiment; and respective joint angles of the virtual robot 1302 for generating a position and orientation corresponding to the position/orientation Pc of the target coil 107.

In step S1202 the CG generator 1102 generates, based on information of the generated reproduction environment 1301, a CG image of the virtual robot 1302 and the surrounding environment thereof, from the viewpoint of the virtual camera 1304 installed on the virtual robot 1302.

Next, ensuing step S1203 to step S1206 perform operations similar to those in step S203 to step S206 in the first embodiment. However, in step S202 of the first embodiment, the captured image 301 is the input image, but in step S1202 instead of the captured image 301 the CG image is the input image. In addition, in step S203 of the first embodiment, measurement information is obtained from the tracker 106, but in step S1203, instead of the tracker 106, measurement information is obtained from the environment reproduction unit 1101 that establishes the reproduction environment 1301.

As explained above, by virtue of the present embodiment, a viewer can confirm intuitively and easily position misalignment by observing a composite image that emphasizes a displacement and a size of a robot or a portion of a target that the robot operates, in a CG image that is generated.

Third Embodiment

In the third embodiment, similarly to the first embodiment, explanation is given for a robot information display system in which it is possible to, after viewing an output composite image, change an operation gain of a robot in accordance with a degree of emphasis of emphasized position misalignment, to actually operate the robot.

In a conventional system, there is a form in which, with respect to an operation by a teaching pendant, a robot operates by a fixed operation gain set by an teacher. However, when it is far from a target position, the operation gain is insufficient, and when it is close to the target position there is a necessity to decrease the operation gain, and moreover, to accurately align to a target value it is necessary to finely observe movement of the robot and confirm position misalignment.

In the present embodiment, by emphasizing a displacement or size of a portion of the robot or a target that the robot operates in the captured image, a viewer can easily confirm position misalignment. Furthermore, based on a difference between a target value position and a current position, the degree of emphasis of the position misalignment is caused to change automatically, and the degree of emphasis and the operation gain of the robot are caused to interwork. Thereby, it is possible to cause the robot to operate at high speed if far from the target position, and at low speed as the target position is approached, and it is possible to teach a more complicated and delicate operation simply and in a short time.

FIG. 14 illustrates a configuration of a robot information display system as a whole, in which an action force generated when parts that a robot grips and performs inserting for contact each other is emphasized in a captured image and output to a viewer, and operation gain of the robot is changed in accordance with a degree of emphasis.

A robot 1401 through to a display unit 1414 in FIG. 14 respectively correspond to the robot 101 to the display unit 114 in FIG. 1 of the first embodiment, and have the same functions. However, the robot 1401 operates in accordance with an operation signal from a robot operation unit (for example, an operation board) 1417. In addition, a display information emphasizing unit 1411 generates an emphasized image based on a degree of emphasis set by a degree-of-emphasis setting unit 1415.

The degree-of-emphasis setting unit 1415 sets a magnification factor, which is the degree of emphasis of the emphasized image generated by the display information emphasizing unit 1411, based on measurement information of the position/orientation Pc of a target coil 1407, and environment information of the robot 1401 and a periphery thereof, such as a position of a fixed part 1404 or a positional relationship, held by a position/orientation obtaining unit 1409, between the target coil 1407 and a finger 1402 of the robot 1401.

An operation gain setting unit 1416 sets the operation gain of the robot based on the magnification factor set by the degree-of-emphasis setting unit 1415. The robot operation unit 1417 functions as a robot controller that controls the operation of the robot by transmitting a control parameter to the robot 1401, based on the operation gain set by the operation gain setting unit 1416 and an operation of a viewer. The robot operation unit 1417 is comprised by a physical operation component, such as an operation button, an operation controller, or a switch.

Note that, other than components shown in the figure, the system illustrated in FIG. 14 is provided with components installed in a computer, such as a CPU, a ROM, and a RAM. By the CPU reading a program stored in the ROM and executing it on the RAM, operations of various components illustrated in FIG. 14 are controlled. Each kind of components of an image input unit 1408 through to a display output unit 1413 and the degree-of-emphasis setting unit 1415 and the operation gain setting unit 1416 may be realized by dedicated hardware, or may be realized by a program (software) executed by a CPU.

FIG. 15 illustrates a flowchart for describing operations in which a captured image from a camera mounted on a robot leading end is used, visualizing is performed by emphasizing position information necessary for teaching, an operation gain of the robot is set in accordance with a degree of emphasis thereof, to operate the robot. Note that processing that this flowchart illustrates is realized by the CPU reading and executing a program stored in the ROM.

Step S1501 to step S1504 perform operations similar to those in step S201 to step S204 in the first embodiment. In step S1505, the degree-of-emphasis setting unit 1415 sets a degree of emphasis that indicates a degree of emphasis with respect to the position misalignment image. In particular, the degree-of-emphasis setting unit 1415 sets a magnification factor M as the degree of emphasis. The magnification factor M is represented by the following Equation (4).

[EQUATION 4]

$$M = \frac{\alpha}{\sqrt{T_x - T_{tfc}} + \beta} \quad (4)$$

Here, $\alpha$ is a coefficient holding a fixed value for adjusting the degree of the magnification factor M, and $\beta$ is a coefficient having a fixed value for setting a maximum value of the magnification factor to $M=\alpha/\beta$ when the position misalignment is infinitesimal. Tx and Ttfc in Equation (4) are represented by the following Equations (5).

[EQUATION 5]

$$\begin{cases} P_x = (R_x T_x) \\ P_{tfc} = (R_{tfc} T_{tfc}) = P_t \cdot P_f \cdot P_c \end{cases} \quad (5)$$

Pc, Pf, Pt, and Px are the same as respective positions and orientations in the first embodiment, and are obtained from the position/orientation obtaining unit 1409. In this way, by causing the magnification factor M to change dynamically and automatically, it is possible to easily confirm minute position misalignment without performing emphasizing particularly if far from the target position, and increasing the degree of emphasis as the target position is approached.

Step S1506 to step S1508 perform operations similar to those in step S205 to step S207 in the first embodiment. In step S1509 the operation gain setting unit 1416 sets an operation gain G of the robot 1401 based on the set magnification factor M. The operation gain G of the robot 1401 is set as G=1 at a standard time, and is set with a ratio of a unit movement amount at a time of an operation input of the robot 1401. Using the magnification factor M, the operation gain G is caused to dynamically change in accordance with the magnification factor M, as expressed by the following Equation (6).

[EQUATION 6]

$$G = \frac{\gamma}{M} \quad (6)$$

Here $\gamma$ is a proportionality coefficient that has a fixed value for appropriately adjusting a value of the operation gain G with respect to the magnification factor M, and is expressed by Equation (7) so that G=1 when the magnification factor M is a maximum value.

[EQUATION 7]

$$\gamma = \frac{\alpha}{\beta} \quad (7)$$

In step S1509 the robot operation unit 1417 receives a robot operation input in accordance with a button input by a viewer, and causes the robot 1401 to operate. Regarding the operation of the robot 1401, with a tracker 1406 as a basis position, a rotational angle and a three-dimensional position in XYZ directions of an end effector of the robot 1401 are caused to be changed by a viewer's button input. A unit movement amount S of the robot in accordance with one button operation input is expressed by the following Equation (8).

[EQUATION 8]

$$S = Gs \qquad (8)$$

Here, a base movement amount s is a basis maximum speed, and a predetermined speed is set in advance for when causing it to operate at high speed if the operation gain G=1, in other words if the robot is sufficiently far from the target position. With such a configuration, by causing the unit movement amount S to change in accordance with the operation gain G, it is possible to cause the robot to operate a high speed when far from the target position and at low speed as it approaches the target position, and it is possible to perform alignment to the target value by operating the robot swiftly and accurately.

As explained above, by virtue of the present embodiment, by emphasizing a displacement or size of a portion of the robot or a target that the robot operates in the captured image, a viewer can easily confirm a position misalignment. Furthermore, based on a difference between a target value position and a current position, the degree of emphasis is caused to change automatically, and the degree of emphasis and the operation gain of the robot are caused to interwork. Thereby, it is possible to cause the robot to operate at high speed if far from the target position, and at low speed as the target position is approached, and it is possible to teach a more complicated and delicate operation simply and in a short time.

Other Embodiments

<Setting a Plurality of Locations and Priorities and Emphasizing>

For composite images according to the first to third embodiments, emphasizing is performed for position information of one place, but there is no limitation to this. For example, in a case such as when a target object is caused to pass through a vicinity of an obstacle without causing it to contact the obstacle, configuration may be taken to magnify and emphasize a plurality of positions of parts for which contact is possible.

Note that, there is a problem in that, if too many locations are emphasized, the composite image will be greatly changed from the captured image, it will become difficult to confirm a region that is not emphasized, and intuitive understanding of the position information will become difficult. For this reason, if many positions that are candidates for emphasizing are present, configuration may be taken so as to set a priority order or restrict an emphasizing target by adding, for example, to the configuration of the third embodiment an emphasized part selecting unit, which has a function of selecting a position (part) to emphasize. At this point, a teaching order, by which the robot performs alignment with respect to task content that is its objective, is set in advance for the emphasized part selecting unit, and by a viewer designating a current teaching order in accordance with the robot operation unit, it is possible to cause automatic selection of a position to emphasize. Of course, configuration may be taken to provide in the robot operation unit an emphasized position designating unit, such as a trackpad, that designates a position in the captured image, and directly instruct a position to emphasize.

With this, by limiting portions to emphasize in the composite image, intuitive understanding of the position information is possible, even if there are many candidate positions for emphasizing.

<When Deforming in Accordance with Action Force>

For emphasized images in the first to third embodiments, emphasizing is performed for position information necessary when teaching, but there is no limitation to this. In addition, with respect to a displacement amount or an amount of change, such as that of an angle, a speed, an acceleration, or an action force, if it is information for which emphasizing in accordance with magnification, movement, or deformation is possible, any such information may be used. For example, a force sensor is added to the robot and an action force generated by an action such as a contact between the target part and the fixed part is measured, and this may be visualized and emphasized. FIGS. 16A and 16B illustrate a pre-emphasis image (FIG. 16A) and a post-emphasis image (FIG. 16B) for an action force f generated by contact on a contact point 1605 when inserting a target part 1602 gripped by a finger 1601 of the robot into an insert position 1604 on a fixed part 1603.

In such a case, assuming that the target part 1602 is weak in terms of strength and is an easy to break object, the target part 1602, to which more attention should be paid, is emphasized by reducing in a direction that the action force f occurs. Of course, configuration may be taken to deform both in proportion to a strength ratio or a hardness, or if a shear force due to friction is occurring, and configuration may be taken to deform diagonally in a shear direction instead of reducing.

With this, it is possible to understand intuitively the size and position of an occurrence of an action force which originally could not be confirmed by only viewing the captured image.

<When Emphasizing Angle Misalignment>

Figure 17A:
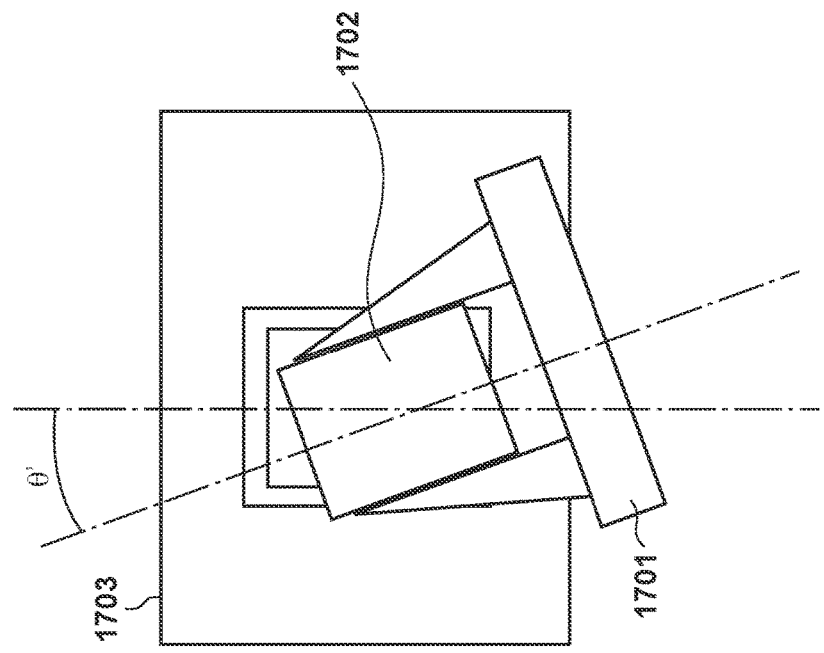
FIGS. 17A and 17B are views for illustrating states before and after emphasizing angle misalignment of a target part with respect to a fixed part, according to another embodiment.
Figure 17B:
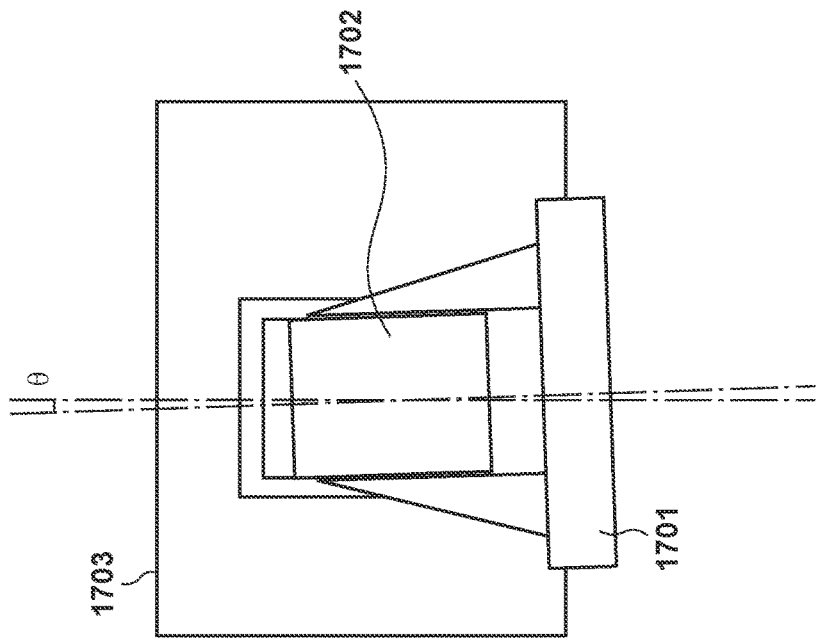

As another example, configuration may be taken such that if misalignment occurs in a rotational angle between the target part and the fixed part, this is emphasized. FIGS. 17A and 17B illustrate a pre-emphasizing image (FIG. 17A) and a post-emphasizing image (FIG. 17B) of an angle misalignment θ that occurs when teaching an inserting operation of a rectangular target part 1702 gripped by a finger 1701 of the robot into a fixed part 1703.

The target part 1702 is inclined θ=2 degrees with respect to an inserting angle of the fixed part 1703, and as is inserting cannot be performed; however, because angle misalignment is very small, as illustrated in FIG. 17A, confirming misalignment by visual observation is difficult as is. Accordingly, as illustrated in FIG. 17B, by setting the angle misalignment to θ'=20 degrees which is 10 times bigger, the angle misalignment is caused to be emphasized. At this point, the inclination of the finger 1701, which grips the target part 1702, is similarly changed. By changing the angle of the finger 1701, the display composition unit achieves matching of angles of other joints of the robot as necessary, so that a sense of unnaturalness does not occur in a composite image, and then outputs as the composite image.

With this, it is possible to understand intuitively minute angle misalignment between components.

<When Deforming by Acceleration or Speed>

Figure 18A:
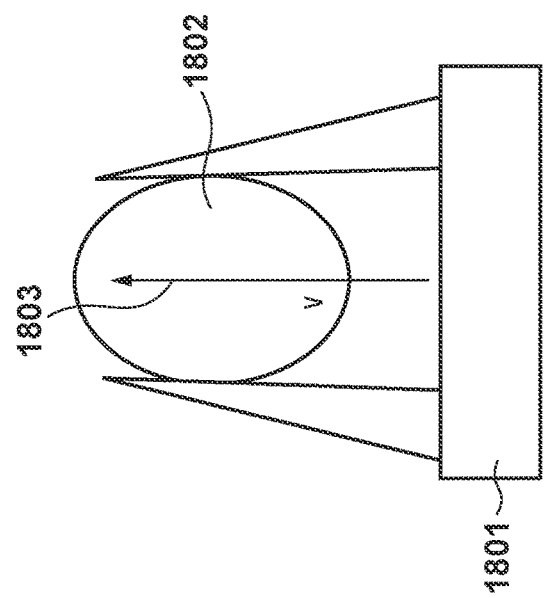
FIGS. 18A and 18B are views for illustrating states before and after emphasizing a speed of a target part and a finger, according to another embodiment.
Figure 18B:
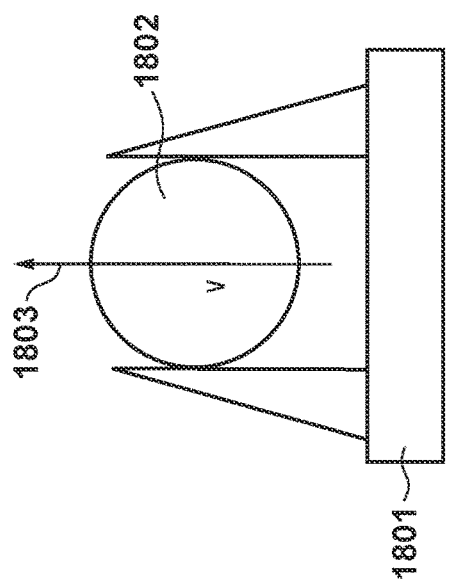

As another example, if a movement speed or an acceleration of the robot is important as information, configuration may be taken to visualize and emphasize this by emphasizing a size of the target part, a finger of the robot, or the like. FIGS. 18A and 18B illustrate a pre-emphasis image (FIG. 18A) and a post-emphasis image (FIG. 18B) for the movement speed, at a time of an operation to move in a movement direction 1803 by a velocity v while a target part 1802 is held by a finger 1801 of the robot.

In the present example, the finger 1801 and the target part 1802, which are targets to be emphasized, are emphasized by magnifying in proportion to the velocity v in the movement direction 1803. Of course, if acceleration instead of the velocity v is important as information, emphasis may be performed in accordance with the acceleration. In addition, in addition to magnifying, a video effect such as outputting an afterimage along a path of movement may be performed.

With this, even in a situation such as where a pattern in a background is deficient and a relative movement speed is difficult to understand, it is possible to understand intuitively a magnitude or a direction of a speed at which the robot moves.

<Automatic/Manual Adjustment of a Degree of Emphasis>

The magnification factor M of the composite image in the third embodiment is automatically set by dynamically using Equation (4), but no limitation is made to this. Any configuration may be used if it is a configuration that automatically or manually sets the magnification factor M. For example, configuration may be taken such that a knob or a like, which is an emphasis degree adjusting unit, is added to the robot operation unit, and a viewer can operate a magnification factor directly. With this, although operations increase, it is possible to perform emphasis as much as a viewer intends. Of course, similarly to the third embodiment, the operation gain G of the robot may be changed in accordance with the magnification factor M set manually.

<Method of Emphasizing and Achieving Matching when Rendering CG>

For composite images in the second embodiment, emphasizing is performed using a CG image generated in step S1202, but there is no limitation to this. If it is possible to finally output as CG a composite image based on CAD data, a configuration that implements other emphasizing may be used. For example, instead of generating the CG image in step S1203, three-dimensional shapes in the CAD data of the virtual target part 1305 and the virtual fixed part 1306 obtained from the measurement information obtaining unit 1109 are held in advance, and in step S1204 only portions corresponding to emphasized target regions of the virtual target part 1305 and the virtual fixed part 1306 are extracted, magnified in a three-dimensional shape stage, and caused to be emphasized.

Configuration may be taken to use a form in which the display output unit 1113 causes a CG image to be generated in step S1206 while obtaining a match by causing the magnification factor of a three-dimensional shape of an emphasized target region periphery (within a predetermined area centered on a position (e.g., a centroid) that defines the emphasized target region) to change in step S1205.

In this way, by causing magnification/emphasizing as a three-dimensional shape, it is possible to generate a composite image that is less inconsistent as an image, and for which it is easy to intuitively understand position misalignment.

<Method of Obtaining a Match by Using Degrees of Freedom Originally not Movable>

In step S1205, by processing in which the display composition unit 1105 obtains a match, the magnification factor of a three-dimensional shape of an emphasized target region periphery is caused to be changed, but limitation is not made to this. If there is a configuration by which it is possible to compose the emphasized display information and the non-emphasized display information without a sense of unnaturalness, other processing that achieves matching may be performed. For example, instead of causing the magnification factor to be changed, the three-dimensional shape of the emphasized target region periphery may be caused to be translated or rotated. For example, when the virtual target part 1305 is magnified, as is the virtual finger 1303 of the emphasized target region periphery that grips the virtual target part 1305, which is the emphasized target region, enters a state in which misalignment with a gripping position occurs as illustrated in FIG. 19A. Here, instead of a translational direction 1901 in which the virtual finger 1303 originally moved, as illustrated in FIG. 19B, rotation is caused for a rotation direction 1902 of a base, and it is made to be matching with the gripping position.

With such a configuration, by causing the emphasized target region periphery of the robot to move to a position or in a rotation direction in which there is no operation originally, it is possible to generate a composite image that has no inconsistency as an image and by which it is easy to intuitively understand position misalignment.

<Method of Explicitly not Dividing Emphasized Target Region and Non-Emphasized Target Region>

By processing that achieves matching in step S206 of the first embodiment for example, the display composition unit in the first to third embodiments sets a matching region between the emphasized display information and the non-emphasized display information to achieve matching, but limitation is not made to this. If there is a configuration by which it is possible to compose the emphasized display information and the non-emphasized display information without a sense of unnaturalness, other processing that achieves matching may be performed. For example, configuration may be taken to set a maximum magnification factor M in a central portion of the emphasized display information, and achieve matching by gradually causing the magnification factor M to decrease as a region corresponding to the non-emphasized display information is approached.

With such a configuration, by causing a degree of emphasis to change continuously with respect to the non-emphasized display information having centered on the emphasized display information, it is possible to generate a composite image for which there is less inconsistency as an image.

Effect of Embodiments

In the first embodiment, the captured image from the camera mounted on a robot leading end is used, visualization after emphasizing position information necessary at time of teaching is performed, and outputting to a viewer is performed. With this, by observing a composite image that uses the image captured by the camera, the viewer can confirm position misalignment intuitively and easily.

In the second embodiment, in an offline teaching environment reproduced by a computer in place of an actual robot, a CG image is used to perform visualizing that emphasizes the position information necessary at a time of teaching, and outputting to a viewer is performed. With this, by observing a composite image that uses the CG image, the viewer can confirm position misalignment intuitively and easily.

In the third embodiment, similarly to the first embodiment, after viewing an output composite image, an operation gain of a robot is changed in accordance with a degree of emphasis of emphasized position misalignment, to actually operate the robot. With this, at a time of teaching the robot, a viewer can easily confirm position misalignment. Furthermore, it is possible to cause the robot to operate at high speed if far from the target position, and at low speed as the target position is approached, and it is possible to teach a more complicated and delicate operation simply and in a short time.

Definitions

The measurement information obtaining unit may be anything if it holds measurement information by any of one or more measurement scales (measurement references) of a position, an orientation, a speed, an acceleration, or an action force of a processing target that includes at least one of the robot and a target that the robot operates. An example is the measurement information obtaining unit according to the first to third embodiments.

In addition, the display information conversion unit may be anything if it can convert the measurement information into information that is viewable by a viewer. An example is the display information conversion unit in the first and third embodiments, which renders, with respect to the captured image, edges of a component and a crosshair cursor on positions of the target part and the fixed part. Also, another example is the display information conversion unit in the second embodiment, which renders, with respect to a CG image, edges of a component and a crosshair cursor on positions of the target part and the fixed part.

In addition, the display information emphasizing unit may be anything if it emphasizes a feature (displacement or size) of a part of the processing target, which includes at least one of the robot and a target that the robot operates. An example is the display information emphasizing unit in the first to third embodiments that magnifies and emphasizes the position misalignment between the target part and the fixed part.

The display composition unit may be anything if it composes by achieving matching between the emphasized display information, which is emphasized by the display information emphasizing unit, and the non-emphasized display information, which is other than the emphasized display information in the display information and is not emphasized. An example is the display composition unit in the first to third embodiments that unifies by achieving matching by providing a matching region between the emphasized display information and the non-emphasized display information so that a sense of unnaturalness is not present.

In addition, the display output unit may be anything if it outputs composite display information composed by the display composition unit to a viewer. An example is the display output unit in the first to third embodiments.

In addition, an information holding unit, an information conversion unit, a display information emphasizing unit, and a display composition unit, may be a form in which a storage medium storing program code of software that realizes functions thereof is supplied to a system or an apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-005287, filed Jan. 14, 2015, which is hereby incorporated by reference herein in its entirety.

What is claimed is:

1. A display control apparatus configured to display an operation of a robot, the display control apparatus comprising:
   at least one processor; and
   at least one memory coupled with the at least one processor and storing instructions that, when executed by the at least one processor, cause the display control apparatus to:
   obtain measurement information of a processing target that includes at least one of the robot and a target that the robot operates;
   generate, based on the measurement information, display information that is viewable by a viewer;
   generate emphasized display information that emphasizes a feature of a portion of the processing target by magnifying or changing angle of or deforming the processing target, based on the display information;
   generate composite display information in which the emphasized display information and non-emphasized display information other than the emphasized display information are composed, the composite display information being generated by matching the emphasized display information and the non-emphasized display information in the display information; and
   output the composite display information to a display device.

2. The display control apparatus according to claim 1, wherein the instructions that, when executed by the at least one processor, further cause the display control apparatus to:

input an image of the processing target,
wherein the display information, which is based on the measurement information, is generated by processing the input image of the processing target based on the measurement information.

3. The display control apparatus according to claim 2, wherein the instructions that, when executed by the at least one processor, further cause the display control apparatus to:
image the processing target,
wherein the imaged processing target is input as the image of the processing target.

4. The display control apparatus according to claim 2, wherein the instructions that, when executed by the at least one processor, further cause the display control apparatus to:
generate a computer graphics (CG) image of the processing target,
wherein the generated CG image of the processing target is input as the image of the processing target.

5. The display control apparatus according to claim 1, wherein at a position at which the measurement information of the processing target changes, the feature of the portion of the processing target is emphasized by causing a magnitude of the processing target in a predetermined area centered on the position to change.

6. The display control apparatus according to claim 1, wherein the feature of the portion of the processing target is emphasized by making a displacement amount of the measurement information of the processing target larger than in reality.

7. The display control apparatus according to claim 1, wherein the feature of the portion of the processing target is emphasized by, in accordance with a speed or an acceleration of the processing target, magnifying a magnitude of the processing target in a direction that the speed or the acceleration is occurring.

8. The display control apparatus according to claim 1, wherein the feature of the portion of the processing target is emphasized by causing a magnitude of a shape of the processing target to deform in accordance with an action force.

9. The display control apparatus according to claim 1, wherein the instructions that, when executed by the at least one processor, further cause the display control apparatus to:
select a portion that is emphasized, if a plurality of candidates of the portion of the processing target that is emphasized are present.

10. The display control apparatus according to claim 9, wherein the portion to be emphasized is selected based on predetermined task content that is an objective of the robot, an operation by a viewer, or both.

11. The display control apparatus according to claim 1, wherein the instructions that, when executed by the at least one processor, further cause the display control apparatus to:
dynamically change a degree of emphasis.

12. The display control apparatus according to claim 11, wherein the degree of emphasis is dynamically changed based on a difference between a current value and a predetermined target value for the feature of the processing target.

13. The display control apparatus according to claim 11, wherein the degree of emphasis is dynamically changed in accordance with an operation from a viewer.

14. The display control apparatus according to claim 1, wherein the instructions that, when executed by the at least one processor, further cause the display control apparatus to:
control the operation of the robot by transmitting a control parameter to the robot,
wherein the control parameter causes an operation gain of the robot to change in accordance with a degree of emphasis of the feature, which is emphasized.

15. The display control apparatus according to claim 1, wherein the emphasized display information and the non-emphasized display information are composed by causing a degree of emphasis between the emphasized display information and the non-emphasized display information to change continuously.

16. A display control method for displaying an operation of a robot, the method comprising:
obtaining measurement information of a processing target that includes at least one of the robot and a target that the robot operates;
generating, based on the measurement information, display information that is viewable by a viewer;
generating emphasized display information that emphasizes a feature of a portion of the processing target by magnifying or changing angle of or deforming the processing target, based on the display information;
generating composite display information in which the emphasized display information and non-emphasized display information other than the emphasized display information are composed, the composite display information being generated by matching the emphasized display information and the non-emphasized display information in the display information; and
outputting the composite display information to a display device.

17. A non-transitory computer-readable storage medium storing a computer program for causing a computer to execute a display control method that displays an operation of a robot, the method comprising:
obtaining measurement information of a processing target that includes at least one of the robot and a target that the robot operates;
generating, based on the measurement information, display information that is viewable by a viewer;
generating emphasized display information that emphasizes a feature of a portion of the processing target by magnifying or changing angle of or deforming the processing target, based on the display information;
generating composite display information in which the emphasized display information and non-emphasized display information other than the emphasized display information are composed, the composite display information being generated by matching the emphasized display information and the non-emphasized display information in the display information; and
outputting the composite display information to a display device.

* * * * *